(12) United States Patent
Zhao et al.

(10) Patent No.: US 11,086,454 B2
(45) Date of Patent: Aug. 10, 2021

(54) TOUCH SUBSTRATE AND DISPLAY DEVICE

(71) Applicants: BOE TECHNOLOGY GROUP CO., LTD., Beijing (CN); Chengdu BOE Optoelectronics Technology Co., Ltd., Chengdu (CN)

(72) Inventors: Biyu Zhao, Beijing (CN); Kwanggyun Jang, Beijing (CN); Lianbin Liu, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu (CN)

( * ) Notice: Subject to any disclaimer, the term of this patent is extended or adjusted under 35 U.S.C. 154(b) by 93 days.

(21) Appl. No.: 16/108,936

(22) Filed: Aug. 22, 2018

(65) Prior Publication Data

US 2019/0204949 A1    Jul. 4, 2019

(30) Foreign Application Priority Data

Jan. 3, 2018  (CN) .......................... 201810004251.5

(51) Int. Cl.
*G06F 3/044*  (2006.01)
*G06F 3/041*  (2006.01)

(52) U.S. Cl.
CPC ............ *G06F 3/044* (2013.01); *G06F 3/0443* (2019.05); *G06F 3/0446* (2019.05);
(Continued)

(58) Field of Classification Search
CPC .......................................... G06F 3/044–0448
See application file for complete search history.

(56) References Cited

U.S. PATENT DOCUMENTS 9,927,476 B2 *   3/2018  Philipp ................. G06F 3/0448
2009/0236151 A1 *  9/2009  Yeh ....................... G06F 3/0443
                                                        178/18.03
(Continued)

FOREIGN PATENT DOCUMENTS

| CN | 103782262 A | 5/2014 |
| CN | 107066160 A | 8/2017 |
| CN | 206470732 U | 9/2017 |

OTHER PUBLICATIONS

First Office Action dated Jun. 1, 2020 for application No. CN201810004251.5 with English translation attached.

*Primary Examiner* — Amare Mengistu
*Assistant Examiner* — Jennifer L Zubajlo
(74) *Attorney, Agent, or Firm* — Nath, Goldberg & Meyer; Joshua B. Goldberg

(57) ABSTRACT

A touch substrate is provided. The touch layer includes a plurality of first electrodes and a plurality of second electrodes. The plurality of first electrodes and the plurality of second electrodes are intersected with and insulated from each other. Each of the plurality of first electrodes includes a plurality of first electrode units arranged in a row direction and connected to each other sequentially, and each of the plurality of second electrodes includes a plurality of second electrode units arranged in a column direction and connected to each other sequentially. The plurality of first electrodes are divided into a plurality of first electrode groups arranged in the column direction, each of the plurality of the first electrode groups includes first electrode units. In each of the plurality of the first electrode groups, the first electrode units in a same column are connected to each other sequentially.

14 Claims, 4 Drawing Sheets

(52) U.S. Cl.
CPC .......... *G06F 3/0448* (2019.05); *G06F 3/0412* (2013.01); *G06F 2203/04111* (2013.01)

(56) References Cited

U.S. PATENT DOCUMENTS

| | | | | |
|---|---|---|---|---|
| 2009/0242283 A1* | 10/2009 | Chiu | G06F 3/0443 | 178/20.01 |
| 2011/0157086 A1* | 6/2011 | Ozeki | G06F 3/0446 | 345/174 |
| 2013/0009905 A1* | 1/2013 | Castillo | G06F 3/0414 | 345/174 |
| 2013/0240342 A1* | 9/2013 | Wang | H03K 17/9622 | 200/600 |
| 2013/0241851 A1* | 9/2013 | Wang | G06F 3/041 | 345/173 |
| 2014/0042410 A1* | 2/2014 | Chen | H01L 51/5203 | 257/40 |
| 2014/0118287 A1* | 5/2014 | Miyamoto | G06F 3/0412 | 345/173 |
| 2014/0176465 A1* | 6/2014 | Ma | G06F 3/0446 | 345/173 |
| 2014/0368755 A1* | 12/2014 | Chen | G06F 1/1692 | 349/12 |
| 2015/0015530 A1* | 1/2015 | Kim | G06F 3/0446 | 345/174 |
| 2015/0015803 A1* | 1/2015 | Wang | G06F 3/0445 | 349/12 |
| 2015/0022731 A1* | 1/2015 | Kang | G06F 3/0443 | 349/12 |
| 2015/0042908 A1* | 2/2015 | Wang | G06F 3/041 | 349/12 |
| 2015/0091852 A1* | 4/2015 | Yoshikawa | G06F 3/0446 | 345/174 |
| 2015/0181716 A1* | 6/2015 | Jaw | H05K 3/4685 | 216/13 |
| 2015/0185892 A1* | 7/2015 | Chae | G06F 3/0443 | 345/173 |
| 2015/0363024 A1* | 12/2015 | Hayashi | G06F 3/0446 | 345/174 |
| 2015/0370375 A1* | 12/2015 | Hayashi | G06F 3/0412 | 345/174 |
| 2016/0162084 A1* | 6/2016 | Wang | G06F 3/0445 | 345/173 |
| 2016/0246425 A1* | 8/2016 | Liu | G06F 3/0412 | |
| 2017/0192557 A1* | 7/2017 | Xiong | G06F 3/0446 | |
| 2018/0233541 A1* | 8/2018 | Zeng | H01L 27/323 | |

* cited by examiner

TOUCH SUBSTRATE AND DISPLAY DEVICE

CROSS-REFERENCE TO RELATED APPLICATIONS

The present disclosure claims the priority of Chinese Patent Application No. 201810004251.5, filed on Jan. 3, 2018, the contents of which are incorporated herein by reference in its entirety.

TECHNICAL FIELD

The present disclosure is related to the technical filed of touch display, in particular, to a touch substrate and a display device.

BACKGROUND

In the field of touch display, a touch layer may have a self-capacitance structure (i.e., single layer on cell, simply referred to as SLOC) and a mutual capacitance structure (i.e., multi layer on cell, simply referred to as MLOC). The mutual capacitance structure can achieve a higher touch accuracy and support multi-touch, and thus is widely adopted.

SUMMARY

According to an aspect of the present disclosure, a touch substrate is provided. The touch substrate includes a touch layer, and the touch layer includes a plurality of first electrodes and a plurality of second electrodes. The plurality of first electrodes and the plurality of second electrodes are intersected with and insulated from each other. A type of the plurality of first electrodes is different from a type of the plurality of second electrodes. Each of the plurality of first electrodes includes a plurality of first electrode units arranged in a row direction and connected to each other sequentially. Each of the plurality of second electrodes includes a plurality of second electrode units arranged in a column direction and connected to each other sequentially. The plurality of first electrodes are divided into a plurality of first electrode groups arranged in the column direction. Each of the plurality of the first electrode groups includes first electrode units arranged in the column direction. In each of the plurality of the first electrode groups, the first electrode units in a same column are connected to each other sequentially.

In an embodiment, the plurality of second electrodes are divided into a plurality of second electrode groups arranged in the row direction. Each of the plurality of the second electrode groups includes second electrode units arranged in the row direction; and in each of the plurality of the second electrode groups, the second electrode units in a same row are connected to each other sequentially.

In an embodiment, each of the plurality of first electrode groups includes two first electrodes; and the plurality of second electrodes are spaced apart and insulated from each other.

In an embodiment, in a same first electrode, two adjacent first electrode units are connected to each other through a first connection portion. In a same second electrode, two adjacent second electrode units are connected to each other through a second connection portion. The first connection portion, the first electrode units and the second electrode units are disposed in a same layer and made of a same material; and the second connection portion and the first connection portion are stacked on each other, and are spaced apart and insulated from each other.

In an embodiment, the second connection portion includes a plurality of metal wires; and the plurality of metal wires are straight line-shaped.

In an embodiment, a length of each of the metal wires is in a range of 50 μm to 100 μm.

In an embodiment, each of the first electrode units includes a first body, and each of the second electrode units includes a second body. For each first body and a second body adjacent to the first body, a group of extension structures are disposed between the first body and the second body. The group of extension structures includes a first extension structure that is disposed on the first body and a second extension structure that is disposed on the second body. The first extension structure is insulated and spaced apart from the second extension structure. The first extension structure includes at least one first conductive stripe connected with the first body, and the second extension structure includes at least one second conductive stripe connected with the second body. The second conductive stripe is disposed between each first conductive stripe and the first body, and the first conductive stripe is disposed between each second conductive stripe and the second body.

In an embodiment, the first extension structure includes a plurality of first conductive stripes, and the second extension structure includes a plurality of second conductive stripes. In the group of extension structures, the plurality of first conductive stripes of the first extension structure and the plurality of second conductive stripes of the second extension structure are disposed alternately one by one.

In an embodiment, each of the first body and the second body is a hexagon. For each first body and a second body adjacent to the first body, the first conductive stripe between the first body and the second body is parallel to an edge of the first body that is proximal to the second body, and the second conductive stripe between the first body and the second body is parallel to an edge of the second body that is proximal to the first body.

According to an aspect of the present disclosure, a touch substrate is provided. The touch substrate includes a touch layer, and the touch layer includes a plurality of first electrodes and a plurality of second electrodes. The plurality of first electrodes and the plurality of second electrodes are intersected with and insulated from each other. Each of the plurality of first electrodes includes a plurality of first electrode units arranged in a row direction and connected to each other sequentially. Each of the plurality of second electrodes includes a plurality of second electrode units arranged in a column direction and connected to each other sequentially. The plurality of first electrodes are divided into a plurality of first electrode groups arranged in the column direction. Each of the plurality of the first electrode groups includes first electrode units arranged in the column direction. In each of the plurality of the first electrode groups, the first electrode units in a same column are connected to each other sequentially. Furthermore, the plurality of second electrodes are divided into a plurality of second electrode groups arranged in the row direction. Each of the plurality of the second electrode groups includes second electrode units arranged in the row direction; and in each of the plurality of the second electrode groups, the second electrode units in a same row are connected to each other sequentially.

In an embodiment, in a same first electrode, two adjacent first electrode units are connected to each other through a first connection portion; and in a same second electrode, two adjacent second electrode units are connected to each other through a second connection portion. Two second electrode units in each of the plurality of the second electrode groups are connected to each other through the second connection portion. The first connection portion, the first electrode units and the second electrode units are disposed in a same layer and made of a same material; and the second connection portion and the first connection portion are stacked on each other, and are spaced apart and insulated from each other.

According to an aspect of the present disclosure, a display device including the touch substrate above is provided.

BRIEF DESCRIPTION OF THE DRAWINGS

The drawings, which constitute a part of the specification, are provided for further understanding of the present disclosure, and serve to explain the present disclosure together with the following detailed description, but are not intended to limit the present disclosure, in which.

DETAILED DESCRIPTION

Embodiments of the present disclosure will be described in detail below with reference to the accompanying drawings. It should be understood that the embodiments described herein are only for the purpose of illustrating and explaining the present disclosure, and are not intended to limit the present disclosure.

Figure 1:
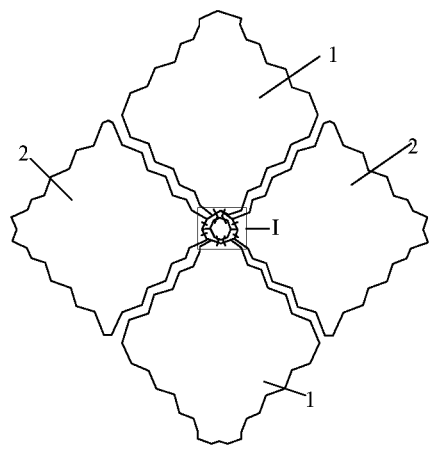
FIG. 1 is a schematic diagram of a mutual capacitive touch layer.
Figure 2:
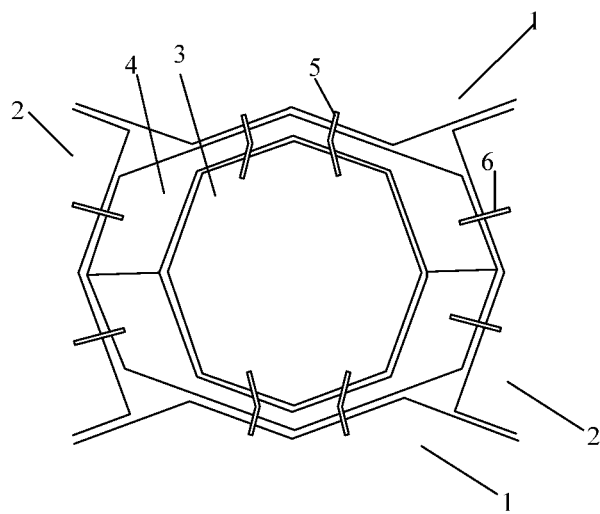
FIG. 2 is an enlarged schematic diagram of an area I in FIG. 1.

FIG. 1 shows a schematic diagram of a mutual capacitive touch layer. The touch layer includes a plurality of sensing electrodes and a plurality of driving electrodes. The driving electrodes include a plurality of driving electrodes 1 arranged in a column direction. The sensing electrodes include a plurality of sensing electrodes 2 arranged in a row direction. As shown in FIG. 2, two adjacent driving electrodes 1 in the same column are connected to a first connection block 3 through first connection bridges 5, and two adjacent sensing electrodes 2 in the same row are connected to a second connection block 4 through second connection bridges 6. The first connection block 3 and the second connection block 4 are insulated and spaced apart from each other, and the first connection bridges 5 and the second connection block 4 are insulated and spaced apart from each other. In such a structure, the sensing electrodes and the driving electrodes may be broken easily, thereby affecting the touch effect and the stability of a resultant product.

Figure 3A:
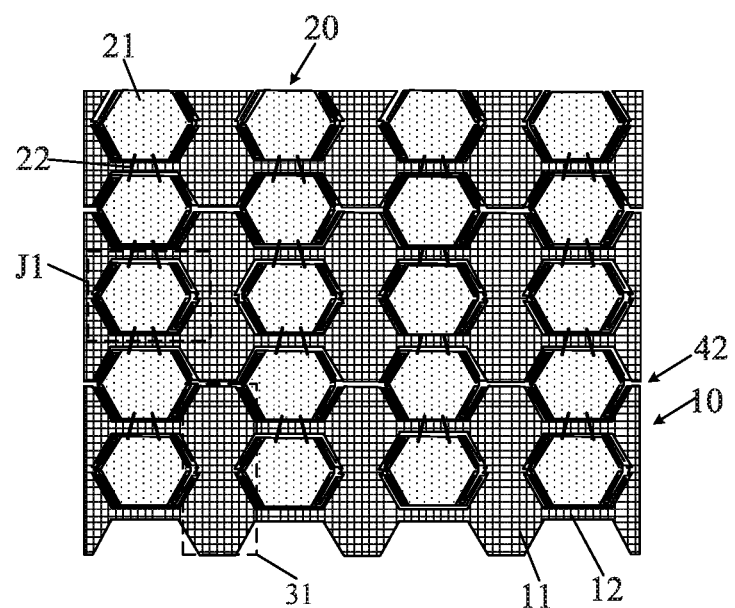
FIG. 3A is a schematic structural diagram of a touch layer in a touch substrate according to an embodiment of the present disclosure.

FIG. 3A is a schematic structural diagram of a touch layer in a touch substrate according to an embodiment of the present disclosure. As shown in FIG. 3A, the touch substrate according to an embodiment of the present disclosure includes a substrate and a touch layer disposed on the substrate. The touch layer includes a plurality of first electrodes 10 and a plurality of second electrodes 20, and the first electrodes 10 and the second electrodes 20 are intersected with and insulated from each other. Each of the first electrodes 10 includes a plurality of first electrode units 11 arranged in a row direction and connected to each other sequentially. Each of the second electrodes 20 includes a plurality of second electrode units 21 arranged in a column direction and connected to each other sequentially. The first electrodes 10 are divided into a plurality of first electrode groups 31 arranged in the column direction, each of the plurality of the first electrode groups (e.g., a first electrode group 31 shown in FIG. 3A) includes first electrode units 11 arranged in the column direction. In each first electrode group 31, the first electrode units 11 in a same column are connected to each other sequentially.

Figure 3B:
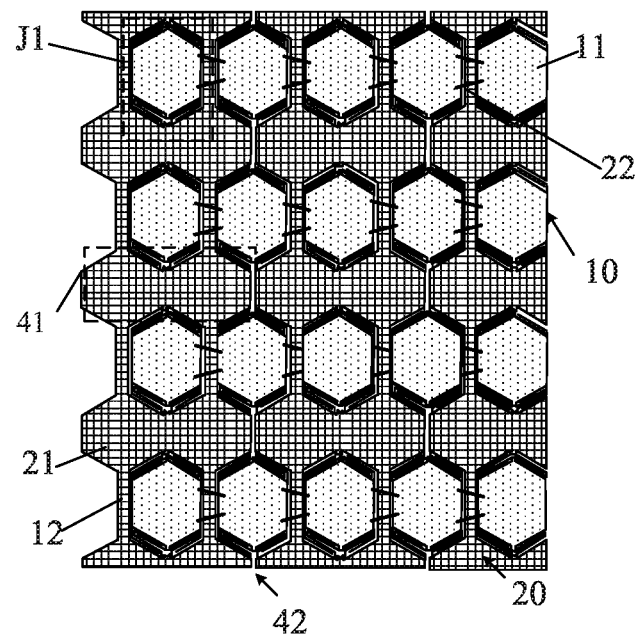
FIG. 3B is a schematic structural diagram of a touch layer in a touch substrate according to an embodiment of the present disclosure.

FIG. 3B is a schematic structural diagram of a touch layer in a touch substrate according to an embodiment of the present disclosure. As shown in FIG. 3B, the touch layer includes a plurality of first electrodes 10 and a plurality of second electrodes 20, and the first electrodes 10 and the second electrodes 20 are intersected with and insulated from each other. Each of the first electrodes 10 includes a plurality of first electrode units 11 arranged in a row direction and connected to each other sequentially. Each of the second electrodes 20 includes a plurality of second electrode units 21 arranged in a column direction and connected to each other sequentially. The second electrodes 20 are divided into a plurality of second electrode groups 41 arranged in the row direction, each of the plurality of the second electrode groups includes second electrode units 21 arranged in a row direction. In each second electrode group 41, the second electrode units 21 in the same row are connected to each other sequentially.

Figure 3C:
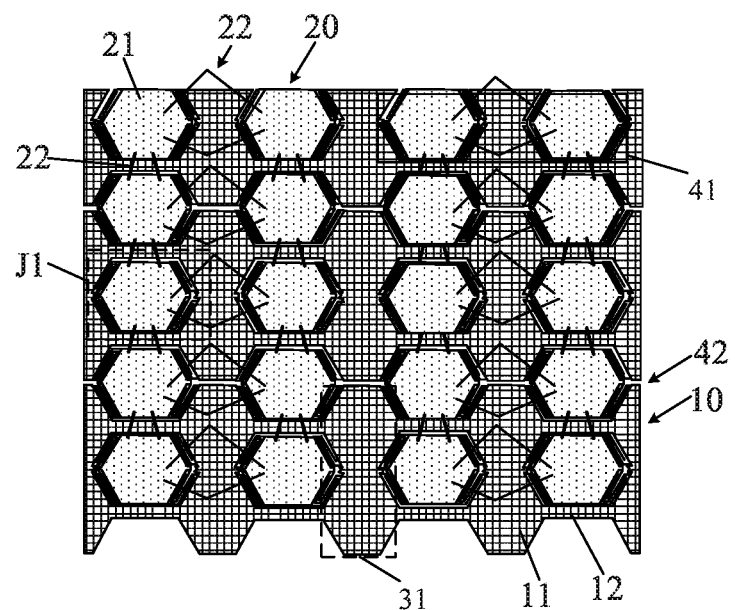
FIG. 3C is a schematic structural diagram of a touch layer in a touch substrate according to an embodiment of the present disclosure.

FIG. 3C is a schematic structural diagram of a touch layer in a touch substrate according to an embodiment of the present disclosure. As shown in FIG. 3C, the touch layer includes a plurality of first electrodes 10 and a plurality of second electrodes 20, and the first electrodes 10 and the second electrodes 20 are intersected with and insulated from each other. Each of the first electrodes 10 includes a plurality of first electrode units 11 arranged in a row direction and connected to each other sequentially. Each of the second electrodes 20 includes a plurality of second electrode units 21 arranged in a column direction and connected to each other sequentially. The first electrodes 10 are divided into a plurality of first electrode groups 31 arranged in the column direction, each first electrode group (such as a first electrode group 31 shown in FIG. 3C) includes first electrode units 11 arranged in the column direction. In each first electrode group, the first electrode units 11 in the same column are connected to each other sequentially. The second electrodes 20 are divided into a plurality of second electrode groups 41 arranged in the row direction, each of the plurality of the second electrode groups 41 includes second electrode units 21 arranged in the row direction. In each second electrode group, the second electrode units 21 in the same row are connected to each other sequentially.

In the embodiment as shown in FIG. 3A, in each first electrode 10, a plurality of first electrode units 11 are arranged in the row direction and connected to each other sequentially. In each second electrode 20, a plurality of second electrode units 21 are arranged in the column direction and connected to each other sequentially. Only the plurality of first electrodes 10 may be divided into a plurality of first electrode groups 31, and the plurality of adjacent first electrode groups 31 is insulated or spaced apart from each other by a dummy structure 42 in a column direction. Each of the first electrode groups 31 includes first electrode units 11 arranged in the column direction; and in each first electrode group 31, the first electrode units 11 in the same column are connected to each other sequentially. The plurality of second electrodes 20 are insulated and spaced apart from each other, so that a dual channel design of the first electrodes 10 is achieved. Two adjacent first electrode units 11 are connected to each other by a first connection portion 12. Two adjacent second electrode units 21 are connected to each other by a second connection portion 22. That is to say, the first electrode units are connected to each other in a two-channel manner by direct conduction, and the second electrode units are connected to each other by a connection bridge, so as to realize a dual channel design of the first electrodes.

In order to increase the value of the sensing capacitance so as to improve the sensitivity and accuracy of the touch screen, the dummy structure 42 may be disposed between the adjacent first electrodes. The electrode units 11 and 21 and the dummy structure 42 may be made of a transparent conductive material (such as indium tin oxide, simply referred to as ITO).

In another embodiment as shown in FIG. 3B, the positions of the plurality of first electrode units and the positions of the plurality of second electrode units in the above embodiment may be exchanged with each other, so as to realize the dual channel design of the second electrodes. Specifically, only the plurality of second electrodes 21 may be divided into a plurality of second electrode groups 41, and the plurality of adjacent second electrode groups may be insulated or spaced apart in a row direction by a dummy structure 42. Each second electrode group 41 includes a plurality of second electrode units 21 arranged in the row direction; in each second electrode group, second electrode units 21 in the same row are sequentially connected to each other. The plurality of first electrodes 10 are insulated and spaced apart from each other. Two adjacent first electrode units 11 are connected to each other by the second connection portion 22; and two adjacent second electrode units 21 are connected to each other by the first connection portion 12. Specifically, the second electrode units 21 are connected to each other by direct connection, and only the first electrodes are connected to each other by a connection bridge, so that a dual channel design of the second electrodes is achieved. For the sake of brevity, the description of the same structure as in the above embodiments is omitted.

In still another embodiment shown in FIG. 3C, the plurality of first electrodes 10 may be divided into a plurality of first electrode groups 31, and the plurality of second electrodes 20 may be divided into a plurality of second electrode groups 41. Two adjacent first electrode groups 31 in a column direction are insulated or spaced apart from each other by a dummy structure 42. In each first electrode group 31, the first electrode units 11 in the same column are connected to each other in sequence. In each second electrode group 41, the second electrode units 21 in the same row are connected to each other in sequence, thereby realizing a dual channel design of the first electrodes and a dual channel design of the second electrodes. In this embodiment, it is shown that each second electrode group 41 includes two second electrode units 21, however it is to be noted that each second electrode group 41 may include three or more second electrode units 21. Two adjacent first electrode units 11 are connected to each other by a first connection portion 12. Two adjacent second electrode units 21 in the row direction are connected to each other by a second connection portion 22, and two adjacent second electrode units 21 in the column direction are connected to each other by a second connection portion 22. That is, the first electrode units 11 are connected to each other in a two-channel manner by a direct connection, and the second electrode units 21 are connected to each other in a two-channel manner by connection bridges. For the sake of brevity, the description of the same structure as in the above embodiments is omitted.

Hereinafter, the detailed arrangement of the first electrodes 10 and the second electrodes 20 will be described in detail by taking the dual channel design of the first electrodes 10 described with reference to FIG. 3A as an example. Each of the first electrodes 10 may be a touch driving electrode, and each of the second electrodes 21 may be touch sensing electrode.

In the touch layer as shown in FIGS. 1 and 2, each driving electrode 1 includes a column of driving electrode units. Each sensing electrode 2 includes a row of sensing electrode units. In this case, a breakage occurring between two adjacent driving electrode units in the same column or between two adjacent sensing electrode units in the same row will affect the touch effect and the stability of a resultant product.

In the present embodiment, dividing only the plurality of first electrodes 10 into a plurality of first electrode groups 31 will be described as an example. In each first electrode group 31, since the first electrode units 11 in the same column are connected together, a breakage of one of the first electrode units 11 in the first electrode group 31 cannot affect other first electrode units 11. Signal transmission can still be performed by other first electrode units 11 in the first electrode group 31, thereby improving the touch effect and improving the stability of the touch substrate. Therefore, the first electrode groups 31 as a whole can be used as a touch driving electrode. Compared with the case where a single first electrode unit 11 is used as a touch driving electrode, the overall resistance of the touch driving electrode can be reduced, so as to improve the strength of the transmitted signal and improve the touch effect.

In addition, breakage prevention due to the dual channel design of the second electrodes 21 described with reference to FIG. 3B is the same as that illustrated with reference to FIG. 3A, and thus detailed description thereof is omitted.

According the embodiment shown in FIG. 3C, in each first electrode group 31, since the first electrode units 11 in the same column are connected together, a breakage of one of the first electrode units 11 in the first electrode group 31 cannot affect other first electrode units 11. Signal transmission can still be performed by other first electrode units 11 in the first electrode group 31, thereby improving the touch effect and improving the stability of the touch substrate. Furthermore, in each second electrode group 41, since the second electrode units 21 in the same row are connected together, a breakage of one of the second electrode units 21 in the second electrode group 41 cannot affect other second electrode units 21. Signal transmission can still be performed by other second electrode units 21 in the second electrode group 41, thereby improving the touch effect and improving the stability of the touch substrate. Therefore, the first electrode groups 31 as a whole can be used as the touch driving electrode, and the second electrode groups 41 as a whole can be used as the touch sensing electrode. Compared with the case where a single first electrode unit 11 is used as a touch driving electrode and a single second electrode unit 21 is used as the touch sensing electrode, the overall resistance of the touch driving electrode and/or the overall resistance of the touch sensing electrode can be reduced, so as to improve the strength of the transmitted signal and improve the touch effect.

The example that the first electrode unit 11 is used as the touch driving electrode unit and the second electrode unit 21 is used as the sensing electrode unit is described above. However, the present disclosure is not limited thereto. For example, the first electrode unit 11 can be used as a sensing electrode unit, and the second electrode unit 21 can be used as a touch driving electrode unit as well. A smaller number of the first electrode groups 31 or the second electrode groups 41 will affect the accuracy of the touch position. To improve the accuracy of the touch position, as shown in FIG. 3A, in the present embodiment, the plurality of first electrodes 10 are divided into the plurality of the first electrode groups 31, and each of the first electrode groups 31 includes two first electrode units 11. The plurality of the second electrode units 21 are spaced apart from each other. In other words, two first electrode units 10 may serve as a touch driving electrode, and each second electrode unit 21 may serve as a touch sensing electrode. In each first electrode group 31, two first electrode units 11 in the same column may be formed as a whole. It is to be noted that each of the first electrode groups 31 may include three or more first electrode units 11 that are used as a touch driving electrode as a whole.

In an embodiment, as shown in FIG. 3A, in the same first electrode 10, two adjacent first electrode units 11 are connected to each other through the first connection portion 12. In the same second electrode 20, two adjacent second electrode units 21 are connected to each other by the second connection portion 22. The first connection portions 12, the first electrode units 11, and the second electrode units 21 are disposed in the same layer and made from the same material. That is, in the process of manufacturing the touch substrate, the first connection portions 12, the first electrode units 11, and the second electrode units 21 are formed in a single step. The second connection portions 22 and the first connection portions 12 are stacked on each other, and insulated and spaced apart from each other. As shown in FIG. 3A, in the same second electrode 20, two adjacent second electrode units 21 are connected to each other by the second connection portion 22. The first connection portion 12 is provided between the two adjacent second electrode units 21. The first connection portion 12 is located in a layer below the second connection portion 22 for connecting the two first electrode units 11 on the left and right sides of the second electrode units 21 respectively.

The first connection portions 12, the first electrode units 11, and the second electrode units 21 are all made of a transparent conductive material such as indium tin oxide (ITO). The second connection portion 22 includes a plurality of metal wires, and the metal wires may be line-shaped, for example, straight line-shaped.

In the embodiment as shown in FIG. 2, the first connection bridges 5 and the second connection bridges 6 generally made of a conductive and light-proof metal may block the light to produce a "shadow". To prevent the "shadow", longer connection bridges are generally designed as fold lines (such as the first connection bridge 5 in FIG. 2). However point discharge at a corner of the fold line may break the connection bridge, thereby affecting the stability of a resultant product.

In the present embodiment, since two adjacent first electrode units 11 are connected together, the width of the first connection portion 12 can be reduced, thereby the distance between two adjacent second electrode units 21 in the same second electrode 20 can be reduced, and thus the length of the metal wires can be reduced. The metal wires can be made in line-shaped (e.g., the shape of straight line) due to the reduced length, as a result, the phenomenon of point discharge can be reduced, and the breakage probability of the second electrode 20 can be reduced too.

In an embodiment, the length of each of the metal wires (i.e., the second connection portions 22) is in a range of 50 µm to 100 µm, and the width of each of the metal wires is in the range of 2 µm to 5 µm, therefore the influence on display can be reduced, and shadow elimination effect can be improved.

In an embodiment, as shown in FIGS. 3A to 5, each of the first electrode units 11 includes a first body 111, and each of the second electrode units 21 includes a second body 211. For each first body 111 and the second body 211 adjacent to the first body 111, groups of extension structures are disposed between the first body 111 and the second body 211, each group of extension structure includes a first extension structure that is disposed on the first body 111 and a second extension structure that is disposed on the second body 211, the first extension structure is insulated from the second extension structure. The first extension structure includes at least one first conductive stripe 112 connected with the first body 111, and the second extension structure includes at least one second conductive stripe 212 connected with the second body 211. The second conductive stripe 212 is disposed between each first conductive stripe 112 and the first body 111, and the first conductive stripe 112 is disposed between the second conductive stripe 212 and the second body 211. According to the embodiment, the first electrode unit 11 includes the first body 111 and the first extension structure, and the second electrode unit 21 includes the second body 211 and the second extension structure. The second conductive stripe 212 is disposed between the first conductive stripe 112 of the first extension structure and the first body 111, and the first conductive stripe 112 is disposed between the second conductive stripe 212 of the second extension structure and the second body 211. Compared with a bulk body used as an electrode, an area between the first electrode unit 11 and the second electrode unit 21 adjacent to the first electrode unit 11 is increased, thereby improving the sensitivity and accuracy of the touch control.

Figure 4:
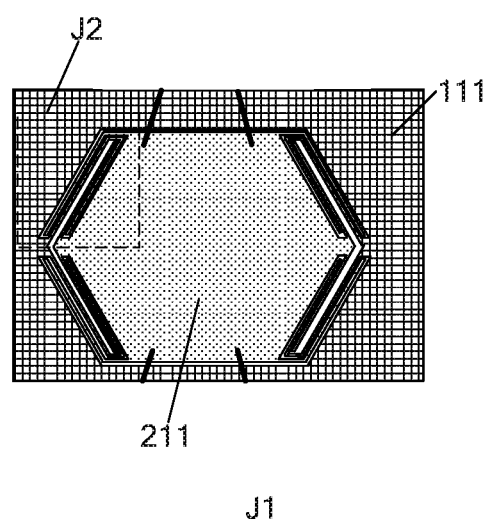
FIG. 4 is an enlarged schematic diagram of an area J1 in each of FIGS. 3A to 3C.

Referring to FIGS. 3C and 4, for example, in the central position of the touch substrate, four first electrode units 11 are adjacent to one second electrode units 21; and for example in the left and right of the touch substrate, two second electrode units 21 are adjacent to one first electrode unit 11.

Figure 5:
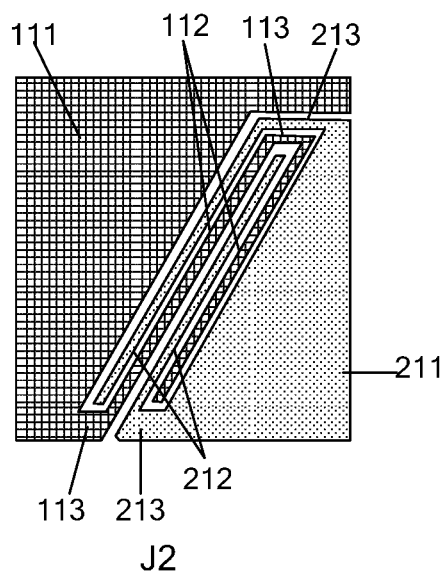
FIG. 5 is an enlarged schematic diagram of an area J2 in FIG. 4.

It should be noted that a second body 211 adjacent to a first body 111 means that neither another first body 111 nor another second body 211 is located between the first body 111 and the second body 211. As shown in FIGS. 3A and 5, a second body 211 adjacent to a first body 111 refers to the second bodies 211 of the second electrode units 21 on both sides of each of the first connection portions 12 directly connected to the first body 111.

The detail structures of the first extension structure and the second extension structure are shown in FIG. 5. Specifically, the first extension structure includes a plurality of first conductive stripes 112, and the second extension structure includes a plurality of second conductive stripes 212. In each group of extension structure, the plurality of first conductive stripes 112 of the first extension structure and the plurality of second conductive stripes 212 of the second extension structure are disposed alternately one by one.

In an embodiment, as shown in FIGS. 3A to 5, each of the first body 111 and the second body 211 is a hexagon. For each first body 111 and the second body 211 adjacent to the first body 111, the first conductive stripe 112 between the first body 111 and the second body 211 is parallel to an edge of the first body 111 that faces (i.e., is proximal to) the second body 211, and the second conductive stripe 212 between the first body 111 and the second body 211 is parallel to an edge of the second body 211 that faces (i.e., is proximal to) the first body 111. As shown in FIG. 5, the first extension structure includes two first conductive strips 112 and first connection strips 113 for connecting the first conductive strips 112 to the first body 111. The second extension structure includes two second conductive strips 212 and second connection strips 213 for connecting the second conductive strips 212 to the second body 211. The edges of the first conductive strips 112, the second conductive strips 212, the first body 111 and the second body 211 (the first conductive strips 112 and the second conductive strips 212 are located in the first body 111 and the second body 211, respectively) are all parallel to each other, and thus the length of the second connection portion 22 can be reduced as much as possible, so as to reduce the influence on the light transmittance.

In an embodiment, a display device including the touch substrate described above is provided. The display device can be applied to on-cell touch display devices. Specifically, the display device may further include a display panel. The display panel includes a lower substrate and an upper substrate disposed opposite to each other. The upper substrate and the substrate of the touch substrate are integrated together. That is, the touch layer is disposed on the upper substrate. The display panel may be a liquid crystal display panel or an organic light emitting diode (OLED) display panel.

According to the embodiments above, the overall resistance of the first electrode and/or the overall resistance of the second electrode can be reduced, the strength of the transmitted signal can be improved, so as to improve the touch effect and the stability of the touch substrate. Therefore, the display device including the touch substrate above has higher stability and a better touch effect.

In addition, sine metal wires with straight line-shaped and small length can be used as the connection portions between adjacent electrode units, the point discharge phenomenon is reduced, so as to improve the display effect of the display device, and improve the stability of the display device.

It should be understood that the above implementations are merely exemplary embodiments for the purpose of illustrating the principles of the present disclosure, however, the present disclosure is not limited thereto. It will be apparent to those skilled in the art that various changes and modifications can be made without departing from the spirit and essence of the present disclosure, such changes and modifications are also to be regarded as falling within the scope of the present disclosure.

What is claimed is:

1. A touch substrate, comprising a touch layer, the touch layer comprising a plurality of first electrode units and a plurality of second electrode units, wherein the plurality of first electrode units and the plurality of second electrode units are insulated from each other, a type of the plurality of first electrode units is different from a type of the plurality of second electrode units, first electrode units in each row are connected in sequence, second electrode units in each column are connected in sequence, and among adjacent rows of first electrode units, first electrode units in each column are connected to each other and constitute one first electrode group such that a plurality of the first electrode groups are connected in sequence along a row direction, wherein in each row of first electrode units, any two first electrode units adjacent along the row direction are connected to each other through a first connection portion, in each column of second electrode units, any two second electrode units adjacent along the column direction are connected to each other though a second connection portion;

the first connection portion, the first electrode units and the second electrode units are disposed in a same layer and made of a same material; and the second connection portion and the first connection portion are stacked on each other, and are spaced apart and insulated from each other, each of the first electrode units comprises a first body, and each of the second electrode units comprises a second body, for each first body and a second body adjacent to the first body, a group of extension structures are disposed between the first body and the second body, the group of extension structures comprise a first extension structure that is disposed on the first body and a second extension structure that is disposed on the second body, the first extension structure is insulated and spaced apart from the second extension structure, the first extension structure comprises at least one first conductive stripe connected with the first body, and the second extension structure comprises at least one second conductive stripe connected with the second body, the second conductive stripe is disposed between each first conductive stripe and the first body, and the first conductive stripe is disposed between each second conductive stripe and the second body, each of the first body and the second body is a hexagon, and for each first body and second body adjacent to the first body, the first conductive stripe between the first body and the second body is parallel to an edge of the first body that is proximal to the second body, and the second conductive stripe between the first body and the second body is parallel to an edge of the second body that is proximal to the first body.

2. The touch substrate according to claim 1, wherein adjacent columns of second electrode units are further divided into a plurality of second electrode groups arranged in the column direction; and each of the plurality of the second electrode groups comprises second electrode units arranged and connected to each other in the row direction.

3. The touch substrate according to claim 2, wherein each of the plurality of first electrode groups comprises two first electrode units; and each of the plurality of second electrode groups comprises two second electrode units.

4. The touch substrate according to claim 2, wherein
two second electrode units in each of the plurality of the second electrode groups are connected to each other through the second connection portion.

5. The touch substrate according to claim 4, wherein
the second connection portion comprises a plurality of metal wires; and
the plurality of metal wires are straight line-shaped.

6. The touch substrate according to claim 5, wherein a length of each of the metal wires is in a range of 50 μm to 100 μm.

7. A display device, comprising the touch substrate according to claim 2.

8. The touch substrate according to claim 1, wherein
each of the plurality of first electrode groups comprises two first electrode units; and
columns of second electrode units are spaced apart and insulated from each other.

9. A display device, comprising the touch substrate according to claim 8.

10. The touch substrate according to claim 1, wherein
the second connection portion comprises a plurality of metal wires; and
the plurality of metal wires are straight line-shaped.

11. The touch substrate according to claim 10, wherein a length of each of the metal wires is in a range of 50 μm to 100 μm.

12. The touch substrate according to claim 1, wherein
the first extension structure comprises a plurality of first conductive stripes, and the second extension structure comprises a plurality of second conductive stripes; and
in the group of extension structures, the plurality of first conductive stripes of the first extension structure and the plurality of second conductive stripes of the second extension structure are disposed alternately one by one.

13. A display device, comprising the touch substrate according to claim 12.

14. A display device, comprising the touch substrate according to claim 1.

* * * * *